United States Patent [19]

Sletten et al.

[11] 3,856,978

[45] Dec. 24, 1974

[54] ADHERENT COATING FOR CAPTIVATING SMALL PARTICLES IN GAS-INSULATED ELECTRICAL EQUIPMENT

[75] Inventors: Andreas M. Sletten; Alan H. Cookson, both of Pittsburgh, Pa.

[73] Assignee: Westinghouse Electric Corporation, Pittsburgh, Pa.

[22] Filed: Feb. 21, 1974

[21] Appl. No.: 444,589

[52] U.S. Cl. .................. 174/14, 174/28, 200/48, 200/293
[51] Int. Cl. ................................. H01b 9/04
[58] Field of Search .......... 174/28, 29, 16 B, 102 D, 174/99 B, 10, 14 R, 15 C; 200/293, 48, 168 G

[56] References Cited
UNITED STATES PATENTS

| | | | |
|---|---|---|---|
| 3,345,450 | 10/1967 | Spindle | 174/28 |
| 3,515,909 | 6/1970 | Trump | 174/28 X |
| 3,515,939 | 6/1970 | Trump | 174/28 X |
| 3,553,410 | 1/1971 | Morva | 200/293 |
| 3,573,341 | 4/1971 | Graybill | 174/28 X |
| 3,740,925 | 6/1973 | Gothard | 174/16 B UX |
| 3,765,941 | 10/1973 | Gordon | 200/168 G |
| 3,767,837 | 10/1973 | Graybill | 174/28 X |
| 3,777,045 | 12/1973 | Artbauer | 174/28 |
| 3,792,188 | 2/1974 | Cronin | 174/28 |

Primary Examiner—Arthur T. Grimley
Attorney, Agent, or Firm—W. R. Crout

[57] ABSTRACT

This invention relates to compressed-gas-insulated systems. An adherent or sticky coating is provided on selected surface areas inside compressed-gas-insulated systems to trap, or to captivate conducting and non-conducting particles, which if allowed to remain free can promote breakdown metallic parts or electrodes maintained at different potentials, or tracking and flashover along insulating surfaces. Preferably, a coating is provided which is initially hard or solid with adequate mechanical strength so that the system components can be easily handled by workmen during manufacturing and assembly without difficulty, and not at this stage capture unwanted particles. At a later time, following assembly operations, thde surface layer of said coating is rendered adherent, or tacky to trap or to captivate conducting and non-conducting particles. During this stage mechanical means such as vibrations and/or gas flow and/or electric fields may be used to transport unwanted particles to the tacky or captivating areas.

Following such captivation, the adherent, or sticky coating may be rendered hard again to trap the unwanted particles permanently. Alternatively, if desired, the coating may be rendered tacky, or captivating again during the life of the equipment to trap unwanted particles generated within or introduced into the system, thus performing a repair or reconditioning of the system.

Another alternative is to maintain the coating sticky or tacky during the operating life of the electrical equipment and rendering the surface hard only during repair or maintenance operations when the system is opened and thus subject to handling and thereby large amounts of unwanted particles.

13 Claims, 19 Drawing Figures

3,856,978

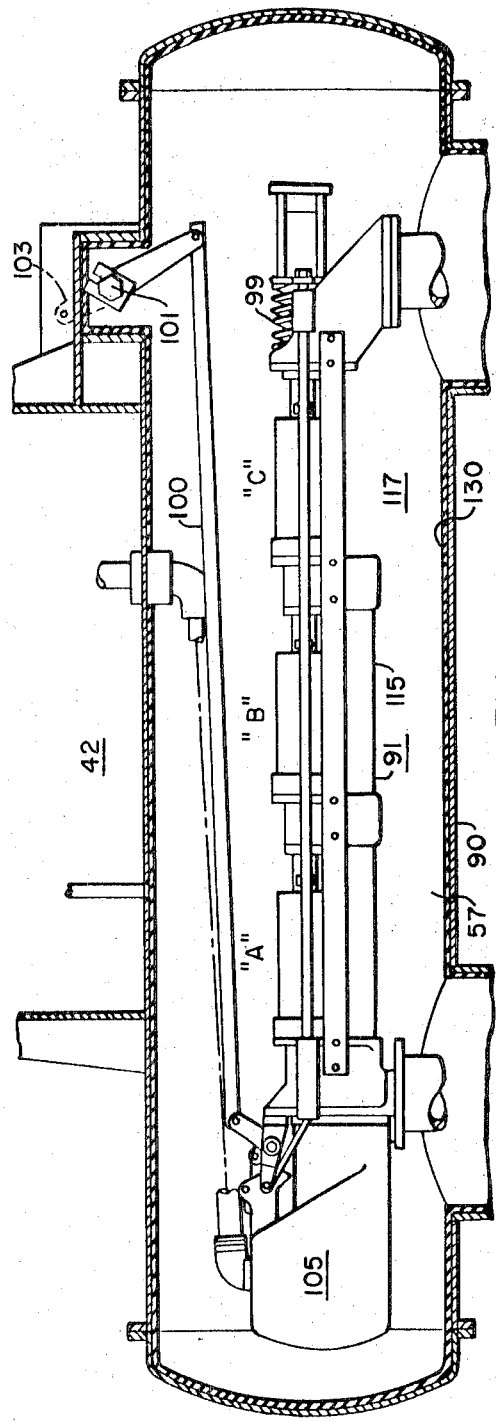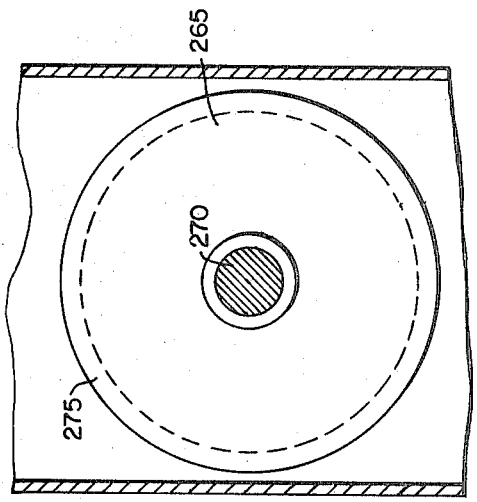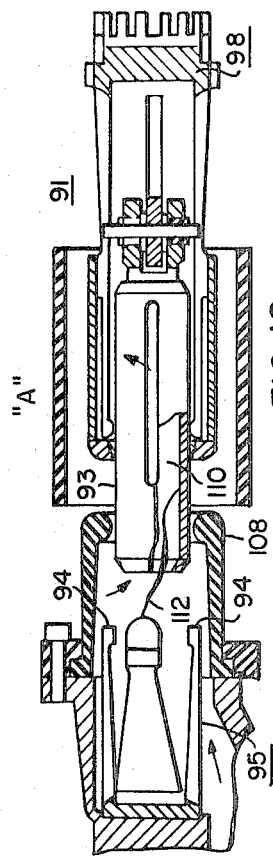

ADHERENT COATING FOR CAPTIVATING SMALL PARTICLES IN GAS-INSULATED ELECTRICAL EQUIPMENT

CROSS-REFERENCES TO RELATED APPLICATIONS

Applicants are not aware of any related patent applications pertinent to the present invention.

BACKGROUND OF THE INVENTION

It has been demonstrated that metallic contamination, such as flakes of plating, light metallic turnings, or small coil-shaped pieces from tapped holes in electrical equipment, are responsive to the electrostatic field in the gas gap between the high-potential electrode parts, and the outer grounded metallic tank, particularly used in gas-filled circuit-breakers. At voltage stress levels below normal service-stress levels, this contamination assumes a charge, and commonly aligns with the electrical voltage gradient. Some shapes or pieces move at random about the floor of the surrounding tank, and others may levitate to contact the upper end of other moving particles, or attach themselves to the high-potential electrode, or contact parts, where again they may wander at random with a luminous discharge at the point of contact. Breakdown sometimes occurs at voltage stresses below the normal line-to-ground voltage of the circuit-breaker application. Such phenomena occurs in gas-insulated circuit-breakers, such as shown in U.S. Pat. No. 3,596,028, Kane et al.; and U.S. Pat. No. 3,154,658, Colclaser, Jr. et al.

In recent years, there has been an effort to reduce the installation land area for substations due to the expense of real estate, or land near large urban areas, and a line of gas-insulated transmission equipment has been designed and sold to supply this utility need for reduced installation areas. The following patents illustrate the general types of equipment involved, and set fort descriptions of pieces, or components of gas-insulated equipment suitable for supplying relatively heavy currents at high voltages within relatively small enclosures: U.S. Pat. No. 3,448,202, D. L. Whitehead; U.S. Pat. No. 3,361,870, D. L. Whitehead; U.S. Pat. No. 3,610,807, D. L. Whitehead; U.S. Pat. No. 3,378,731, D. L. Whitehead; U.S. Pat. No. 3,331,911, D. L. Whitehead; U.S. Pat. No. 2,173,717, H. M. Hobart; U.S. Pat. No. 2,221,670, F. S. Cooper; U.S. Pat. No. 3,515,939, J. G. Trump; U.S. Pat. No. 2,216,010, H. M. Hobart; U.S. Pat. No. 3,345,450, H. E. Spindle; U.S. Pat. No. 2,221,671, F. S. Cooper; and U.S. Pat. No. 3,585,270, J. G. Trump.

In the equipment described in the patents above, the problem exists with small metallic or insulating particles being present and reducing the breakdown voltage between metallic parts at different voltage levels, or reducing parts at different voltage levels, or reducing the flashover voltage along insulating surfaces, particularly along support insulators or spacers.

It is the purpose of the present invention to provide a coating of preselected areas on the metallic and insulating surfaces which can be made sticky, or tacky after assembly and thus trap particles in regions where they will not initiate breakdown.

SUMMARY OF THE INVENTION

In accordance with preferred embodiments of the invention, a coating is provided on selected surface areas within gas-insulated equipment, said coating is preferably hard, or rigid during early assembly operations, and can be rendered sticky or tacky at a preselected time thereafter, by, for example, heating or exposure to a solvent vapor introduced into the electrical equipment. Then, by voltage application between metallic parts and/or by mechanical interaction and/or gravity, the contaminating particles are made to move and deposit on the sticky or tacky coating. Following this process of transporting the particles to the adherent sticky coating, the surface may be rendered hard again by suitable means such as lowering the temperature, or removing the solvent vapor.

Alternatively, the coating may be maintained in an adherent or tacky state during the operation of the equipment by, for example, maintaining a solvent vapor in the equipment during operation, thus enabling the tacky coating to trap particles generated during the operation of the equipment. Another alternative is to render the coating hard or rigid during operation, but, periodically, or after experiencing operational difficulty, again render the coating sticky or tacky, thus effectively performing a repair or reconditioning of the system either during operation or during a shutdown.

Further objects and advantages will readily become apparent by reading the following specifications taken in conjunction with the drawings.

BRIEF DESCRIPTION OF THE DRAWINGS

FIG. 9 is an enlarged vertical sectional view taken through the circuit-breaker structure of FIG. 6, the contact structure being illustrated in the closed-circuit position;

FIG. 10 is an enlarged fragmentary vertical cross-sectional view of the circuit-breaker structure of FIG. 9, showing the contacts in the partly open-contact position;

FIG. 11 is a longitudinal cross-sectional view of a gas-filled cable-length embodying the present invention;

DESCRIPTION OF THE PREFERRED EMBODIMENTS

Figure 1:
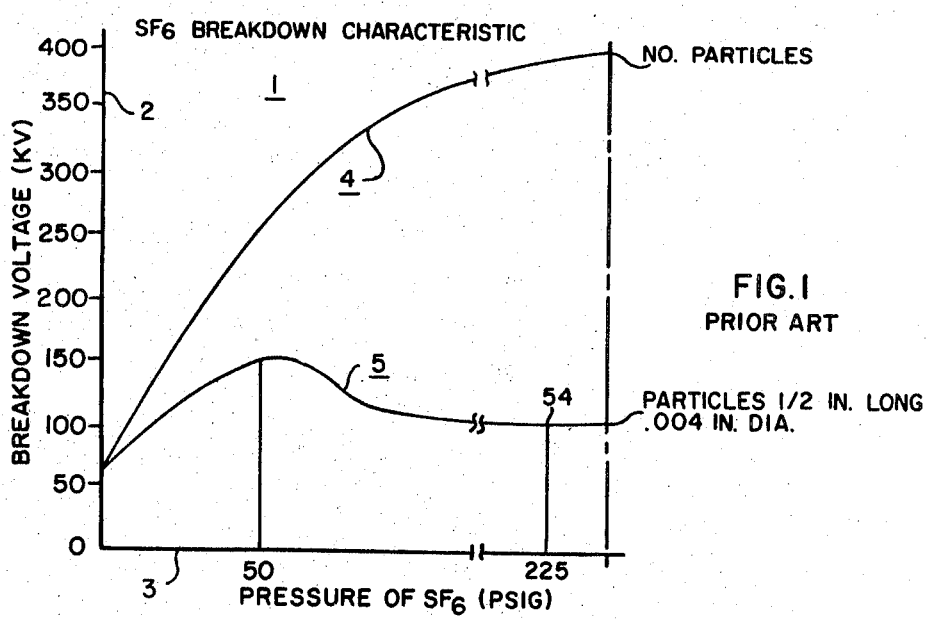
FIG. 1 shows a breakdown characteristic curve for sulfur-hexafluoride gas.

Referring now to the drawings and to FIG. 1 in particular, a sulfur-hexafluoride ($SF_6$) gas insulation breakdown characteristic 1 is depicted wherein alternating breakdown volage in kilovolts (rms) is measured on the ordinate 2 and pressure in pounds per inch gauge is measured on the abscissa 3. Plot or curve 4 shows the breakdown characteristic between two concentric coaxial electrodes with diameter 3 and 10 inches respectively for sulfur-hexafluoride gas with virtually no particles present. On the other hand, plot or graph 5 shows the breakdown characteristic between the same two coaxial electrodes for sulfur-hexafluoride gas which has one half inch long by 0.004 inch diameter cylindrical particles immersed in it. As can be seen by inspecting characteristic or graph 1, sulfur-hexafluoride insulating gas with particles present breaks down at a relatively much lower voltage than the same gas without particles present. In an improved type of circuit interrupter as described in FIGS. 6, 9 and 10, more fully described hereinafter, sulfur-hexafluoride gas 6 is maintained at elevated pressure. However, unless the sulfur-hexafluoride gas insulated system is relatively particle free, as is seldom the case, the breakdown voltage will be drastically reduced compared to the case with no particles present.

Figure 2:
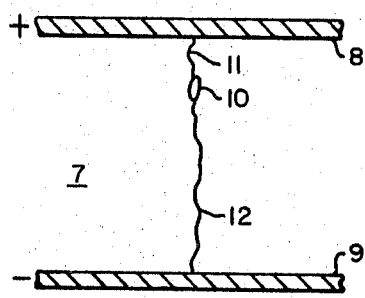
FIG. 2 shows a set of capacitor plates with an interposed particle.
Figure 3:
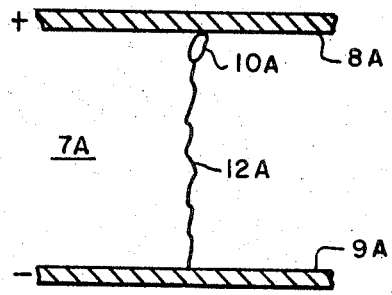
FIG. 3 shows a set of capacitor plates with an interposed particle.

The reason that the pressurized sulfur-hexafluoride gas insulating medium 6 with contaminating particles immersed in it does not properly insulate may be understood by referring to FIGS. 2 and 3. In FIG. 2, a parallel-plate capacitor arrangement 7 having a high-voltage capacitor plate or conductor 8 and a low-voltage capacitor plate or conductor 9 is shown. Interposed between plates 8 and 9 is a particle 10. Particle 10 may be dielectric or insulating or, alternatively, metallic in nature. In other words, it may be either an electrically insulating or an electrically conducting particle. In FIG. 2, particle 10 is shown in a position proximate or close to parallel plate or conductor 8, whereupon it is thought that a small electrical discharge may take place between the particle 10 and the conductor 8. The discharge 11 may cause a discharge 12 to continue from particle 10 to negative conductor or capacitor plate 9 thus causing a complete electrical breakdown between capacitor plates 8 and 9.

A second possible theory is demonstrated graphically in FIG. 3 wherein a similar parallel-plate capacitor arrangement 7A having a positive conductor or plate 8A and a negative conductor or plate 9A is shown. A similar particle 10 is shown attached to or abutting against plate 8A. It is thought in this instance that the protrusion caused by particle 10A jutting or projecting from plate 8A creates a point where there is a relatively high concentration of electric stress and from where a voltage breakdown, as indicated by jagged line 12A, may easily occur. Regardless of which theory explains the breakdowns described, it is clear that the presence of particles 10 or 10A, as shown in FIG. 2 or FIG. 3, respectively, is a significant cause of electrical breakdown between conductors at different potentials.

Figure 4:
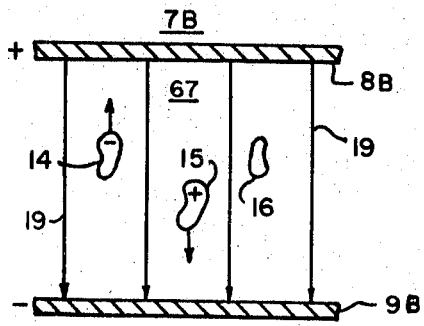
FIG. 4 shows a set of capacitor plates with interposed charged particles and electrical field lines.

Referring now to FIG. 4, another parallel-plate capacitor arrangement 7B is shown wherein parallel-plate capacitor 7B has a positive electrically conducting plate 8B and negative electrically-conducting plate 9B. Interposed between plates 8B and 9B is a plurality of particles 14, 15 and 16. Some particles, such as particle 16, have no charge and are not subjected to a mechanical force from the electric field. Other particles, such as particle 14, have a negative charge and are thus attracted to positively-charged capacitor plate or electrode 8B, while a third type of particle, such as particle 15, has a positive charge and is attracted to the negatively-charged capacitor plate 9B. These charged particles are subjected to forces due to the influence of the electrical field 19 between plates 8B and 9B. As can be seen by reference to FIGS. 2 and 3, if the charged particles 15 and 14 in FIG. 4 migrate or move to the plates of the respective opposite polarities, the "trigatron" effect or the "abutting electrical particle" effect may occur causing a discharge or breakdown between plates 8B and 9B. Of course, it may also be possible for the particles 14 and 15 to migrate to the respective plates of opposite polarity 8B and 9B and merely discharge without causing a breakdown between capacitor plates 8B and 9B. In this case, the respective particles 14 and 15 will merely acquire the potential of the plates 8B and 9B respectively, to which they have migrated and begin to move towards the oppositely-charged plates 9B and 8B respectively. These phenomena could possibly continue independently, only occassionally causing a breakdown in the gaseous insulation, as discussed previously.

Figure 5:
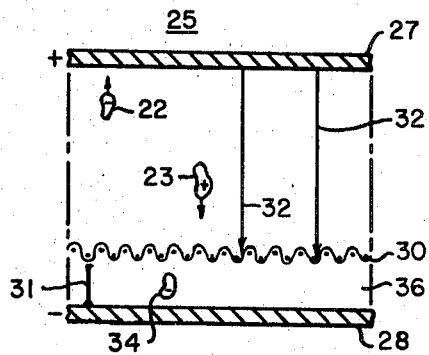
FIG. 5 shows a set of capacitor plates with a metallic grid particle trap.

Referring now to FIG. 5, a proposed well-known method for preventing voltage breakdowns, due to migrating charged particles, such as 22 and 23, is shown in the capacitor combination 25 which includes a pair of oppositely charged electrodes or plates 27 and 28 and a metallic grid or screen 30, which is grounded or connected to one electrode 28 by a conductor 31. In this case, particles 23 and 22, corresponding to particles 15 and 14 in FIG. 4, migrate, as previously described. However, the electrical field, shown by lines 32, extends only to the metallic grid 30, since it is at the same potential or voltage level as plate or conductor 28. Consequently, any particle, such as particle 34, which has filtered through the grid or screen 30 finds itself in a near zero electrical field, or field-free region 36 wherein no forces exist due to the electric field 32 to cause the particle 34 to migrate or move to the oppositely-charged plate 27. U.S. Pat. No. 3,515,939 — J. G. Trump, issued June 2, 1970 explains more of the theory of the functioning of the metallic screen 30.

The particles are of course subjected to gravity forces, buoyancy forces, mutual electrostatic attraction or repulsion, frictional forces when moving relative to the gas and in non-uniform electric fields to dielectrophoretic forces which act even on non-charged particles. Particle impacts on electrodes result also in more or less elastic bouncing of particles. Particles also exchange charge with the gas when electric fields cause a gaseous discharge to occur making charge carriers available in the gas. If the main electric potential applied to the electrodes varies with time as the case is in alternating voltage systems the motion of the particles becomes very complex and no attempt will be made here to provide a complete description of the motion.

Figure 6:
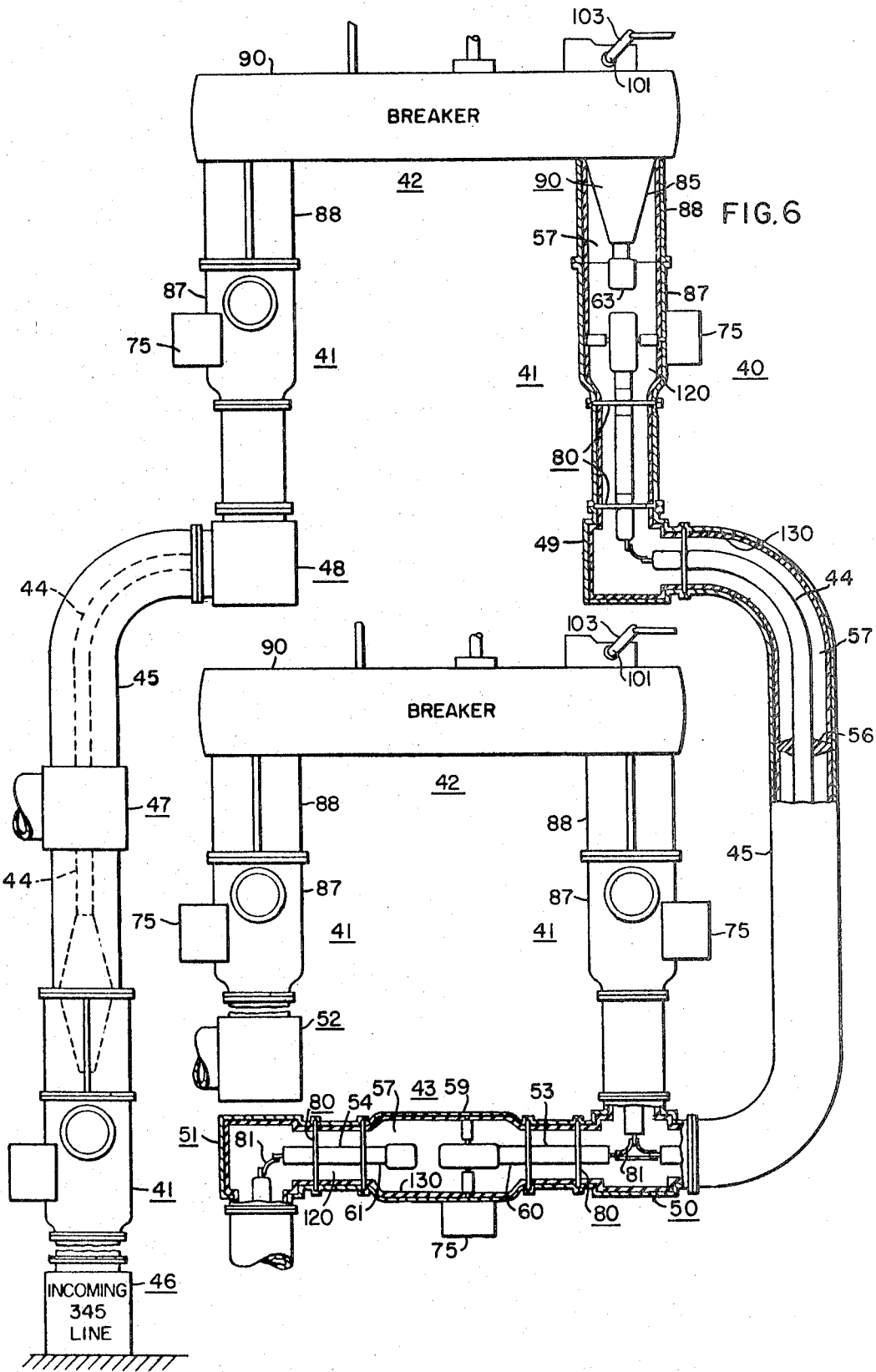
FIG. 6 is a view, in elevation, of a portion of a substation structure embodying features of the present invention.

Referring to FIG. 6 of the drawings, the structure shown therein capable of embodying the present invention comprises one pole-unit 40 of a distribution substation. Additional pole-units 40, similar to the one shown, may be provided as required. Each pole-unit 40 comprises a plurality of vertical disconnect switches 41, circuit-breakers 42, and a horizontal disconnect switch 43 which are interconnected by generally cylindrical bus conductors 44 enclosed in generally cylindrical housings 45 which are joined by various junction boxes 46 to 52 inclusive. Thus, an incoming high-voltage line connected to the junction box 46 may be connected through a vertical disconnect switch 41, a bus conductor 44, a junction box 47, a bus conductor 44, a junction box 48, a vertical disconnect switch 41, a circuit-breaker 42, a vertical disconnect switch 41, a junction box 49, a bus conductor 44, a junction box 50, a bus conductor 53, the horizontal disconnect switch 43, a bus conductor 54, and the junction box 51 to a transformer (not shown). Another high-voltage line may be connected to the system through the junction box 47. Likewise, an additional high-voltage line may be connected to the junction box 52 and thence to the transformer through a vertical disconnect switch 41, a circuit breaker 42, a vertical disconnect switch 41, the junction box 50 and the horizontal disconnect switch 43. Thus, the transformer may be connected to different power sources.

As shown, the bus conductors 44, 53, 54 are supported inside the cylindrical housings 45 by generally disc-shaped insulators 56. The housings 45, the disconnect switches 41 and 43 and the circuit-breakers 42 contain an insulating gas 57, preferably sulfurhexafluoride ($SF_6$) gas, under pressure. The circuit-breakers 42 may be of a gas-blast type, such as, for example, the one described in U.S. Pat. No. 3,154,658, issued Oct. 27, 1964, and assigned to the Westinghous Electric Corporation, and shown more clearly in FIGS. 4 and 5 of the drawings hereinafter more fully described.

Figure 8:
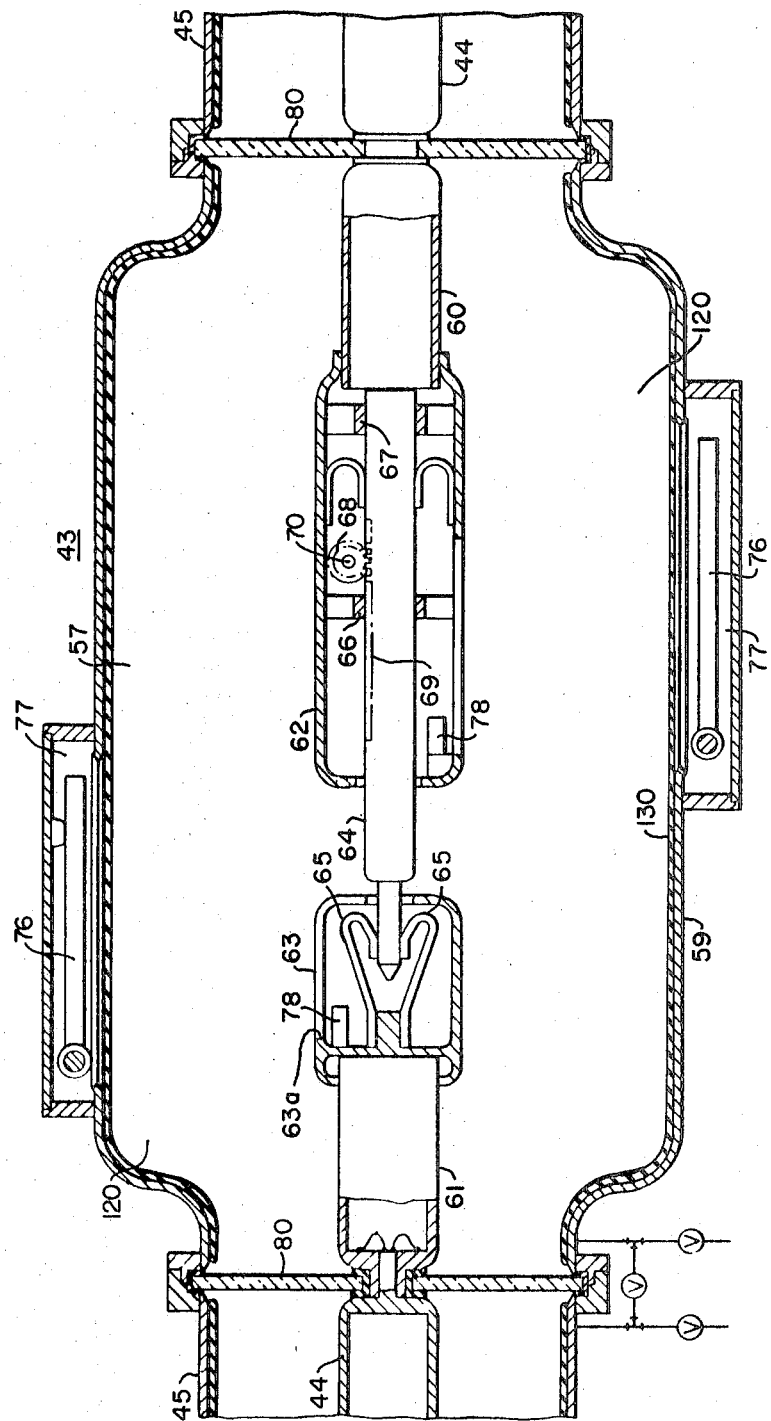
FIG. 8 is a view, similar to FIG. 7, of the horizontal disconnecting switch shown in FIg. 6, again the contacts being shown closed.

The structure of the horizontal disconnect switch 43 is shown in more detail in FIG. 8. The switch 43 comprises a generally cylindrical housing 59 which contains longitudinally spaced cylindrical switch conductors 60 and 61, a generally cylindrical grading shield or electrode 62 having one end attached to one end of the conductor 60, a generally cylindrical grading shield or electrode 63 having one end attached to one end of the conductor 61, and a reciprocating switch-blade 64 which engages breakjaw contact fingers 65 when in the closed position, as shown.

The switch-blade 64 is slidably disposed in guide bearings 66 and 67 mounted inside the electrode 62. The blade 64 is slidably engaged by contact fingers 65 also mounted inside the electrode 63. The reciprocating switch-blade 64 may be actuated by a gear 68 which drives a rack 69 secured to the blade 64. The blade 64 may be actuated by other suitable operating means, if desired.

Figure 7:
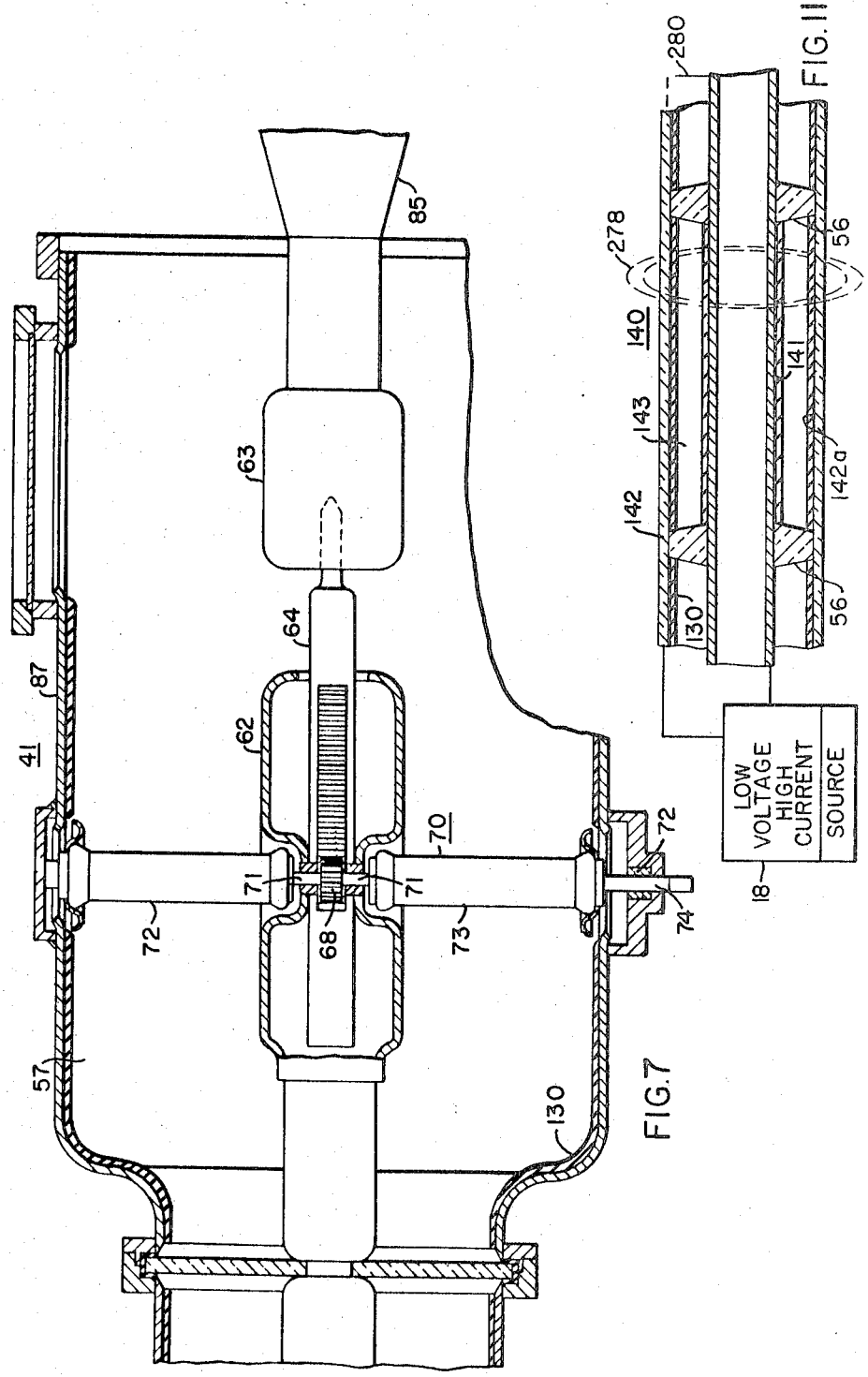
FIG. 7 is an enlarged view, partly in section, and partly in elevation, of one of the vertical disconnecting switches shown in FIG. 6, the contacts being shown closed.

As shown more clearly in FIG. 7, the gear 68 is driven by an insulating shaft 70 rotatably mounted in sealed bearings 71 and 72 disposed in bearing housings. The insulating shaft 76 comprises a short shaft 71 on which the gear 68 is mounted and insulating members 72 and 73 attached to opposite ends of the shaft 70. An extension 74 is attached to one end of the insulating member 73 extends through the bearing 72 and it may be rotated by a suitable mechanism, such as a motor-operated mechanism 75, as shown in FIG. 6.

As shown in FIG. 8, a grounding switch-blade 76 is pivotally mounted in a recessed portion 77 of the housing 59. The blade 76 may be actuated by suitable means to engage a grounding contact jaw 78 disposed inside the electrode 63. A suitable slot 63a is provided in the wall of the electrode 63 to permit the end of the blade 76 to enter the electrode 63. Thus, the portions of the bus structure 44 connected to the electrodes 62 and 63 may be grounded through the grounding switch-blade 76 since the switch housing 59 as well as the bus-conductor housings 45 are grounded.

The combined insulator and barrier units 80 may be of the type fully described in a copending application Ser. No. 474,794, filed July 26, 1965 by D. L. Whitehead which issued July 18, 1967, as U.S. Pat. No. 3,331,911 and which is assigned to the Westinghouse Electric Corporation.

The insulator 80 is preferably composed of a synthetic resin, thereby having sufficient flexibility to take care of thermal expansion in the current conductors. As shown in FIG. 6, flexible connectors 81 may be utilized in the junction boxes 46–52 of the bus structure to take care of expansion of the bus conductors.

The vertical disconnect switch 41 shown in FIGS. 6 and 7 are similar to the horizontal switch 43 with the exception that the break-jaw assembly 63 is supported by a terminal bushing 85 of the circuit-breaker 42 with which the disconnect switch 41 is associated. As shown in FIG. 6, the housing 87 of the disconnect switch 41 is attached to a housing portion 88 of the circuit breaker 42 which encloses the terminal bushing 90 of the circuit-breaker. Further details regarding the description and operation of the electrical equipment illustrated in FIGS. 6–8 are set forth and described in U.S. Pat. No. 3,348,001, issued Oct. 17, 1967 to Upton et al. which is incorporated herein by reference.

FIGS. 9 and 10 generally illustrate in more detail the type of circuit-breaker structure 42 which may be used in combination with the substation equipment 40. The circuit-breaker 42 is more specifically set forth in detail in U.S. Pat. No. 3,154,658, issued Oct. 27, 1964 to R. G. Colclaser, Jr. et al., and assigned to the assignee of the instant application. As set forth in said U.S. Pat. No. 3,154,658, a plurality of breaks "A," "B" and "C" are provided longitudinally in series relationship within an outer grounded tank structure 90 and constitute an arc-extinguishing assemblage 91. A portion of the arc-extinguishing assemblage 91 is illustrated in FIG. 10, which shows the first unit A of the multi-break arc-extinguishing assemblage 91. As shown in FIG. 10, a movable tubular contact 93 makes engagement with stationary finger contacts 94 of a stationary contact structure 95. The moving tubular contact 93 is only one of a number of movable contacts associated with a movable contact assemblage 98, which generally comprises a ladder-like moving assemblage, which is giased to the open-circuit position by accelerating springs 99 (FIG. 9), and is maintained in the closed-circuit position, as shown in FIG. 9, by an operating rod 100 linked to a horizontal operating shaft 101 connected to any suitable mechanism, not shown, by an externally-provided operating lever 103.

During the opening operation, the operating mechanism (not shown) is released to permit thereby the accelerating springs 99 to effect a quick opening of the several movable contacts 93, only one of which is illustrated in FIG. 10. Simultaneously with the releasing action, heretofore mentioned, a gas-blast valve (not shown) is opened to permit a blasting of high-pressure $SF_6$ gas 57 from a high-pressure tank 105 through an insulating nozzle 108 (FIG. 10), and into the interior 110 of the moving tubular contact 93 to effect the extinction of the arc 112 therein. Simultaneously with the blasting action of the gas 57 within the first arc-extinguishing unit A, additional gas flows through a manifold structure 115 and into the second and third breaks B and C, not shown, but each of which is similar to the first break A, illustrated in detail in FIG. 10. Because of the establishment of a plurality of series breaks, A, B and C, each of which is subjected to a flow of $SF_6$ gas under pressure, arc extinction quickly ensues, and the circuit is interrupted.

It will be observed that the $SF_6$ gas 57 which is present within the region 117 within the tank structure 90 of the circuit-breaker structure 42, is also present at the same pressure throughout the system 120.

During the operation of the electrical structures described above in FIGS. 6 to 10, experience has shown that there may be small or minute particles 68 (FIG. 2) of metal or insulation, which may move or levitate within the region and settle on insulating surfaces. It is desirable to trap or captivate these conducting or insulating particles 68 preferably in a region with low electric field so as to maintain a high dielectric strength between the inner component parts, which are at high voltage, and the outer grounded casing 45, 59, 88 and 90. It is the purpose of the present invention to captivate these particles 68 by providing a coating 130 which is applied selectively on the inner surface of the enclosure. This coating 130 is preferably hard or non-tacky during the assembly operations, and it is only at a subsequent time that, through suitable heating means, or entrance of a solvent vapor, as more fully described hereinafter, that the surface of the coating 130 will be rendered sticky or tacky thereby catching the minute conducting or insulating particles 68. The coating 130 can be either kept sticky or tacky during the subsequent operation of the equipment, or the coating 130 may be temporarily hardened. These possibilities will be described more fully later.

FIG. 11 illustrates a portion of a high-voltage transmission system 140 in which a high-voltage conductor 141 is spaced interiorly within the outer grounded sheath 142 also preferably having a high-dielectric-strength gas disposed therein, such as sulfur-hexafluoride ($SF_6$) gas for example. Again, the coating 130 may be provided on the inner wall 142a of the outer grounded sheath 142 as previously mentioned.

In the application of our invention several suitable coatings may be used to implement the invention of trapping conducting and non-conducting particles in regions where they do not decrease the electrical breakdown voltage. Below are descriptions of several such possible coating materials with different properties.

EXAMPLE I — THERMOSETTING EPOXY-RESIN MATERIAL

A B-stage epoxy resin suitable for use in this application, is described in U.S. Pat. No. 2,941,981, and also the curing agent to prepare a B-stage epoxy resin is described later in this patent as later described.

To prepare the B-stage coating 80–90 parts by weight of epoxy resin plus 10 to 20 parts by weight of polyborate ester curing agent is dissolved in a suitable solvent and applied as a coating. The solvent evaporates and the B-stage coating remains. The resulting coating would be a hard, non-tacky coating on the surface. It does not require heat to harden this coating, just evaporation of the solvent. The epoxy resin in this coating is described later. This epoxy resin would be similar to Epon 1001 with an epoxy equivalent weight of 450 to 550 grams per epoxy equivalent. This would comprise 80 to 90 percent of the epoxy resin solution; the remaining 10–20 percent would be the polyborate ester curing agent, described later. The polyborate ester curing agent as described in the same patent columns bottom 6, 7, and foot of column 8. This epoxy resin and curing agent mixture has to be dissolved in a suitable solvent, such as acetone or tulene at about 30 to 40 percent solids, and then can be brushed or sprayed or roller-coated onto any metal surface. When the solvent has evaporated, the resulting coating will be hard, and can be easily handled by workmen. Subsequently, the coating will soften when heated to 89°C, or above. The coating will become tacky, as soon as the metal surface is at 80°C, or above. The heating can be accomplished by any conventional means, or by applying voltage to the metal and will remain tacky at 80°C for 6–8 hours. If the temperature drops below 60°C it will become hard again. It has to be kept at least at 80°C to remain in the tacky state, and it will remain there for some finite length of time, which is determined by the age of that coating. If the coating was applied immediately before fabrication, the tacky time could be anywhere from 4–8 hours at 80°C. To harden the coating, the temperature would have to be raised to 135° to 150°C for 3–4 hours, which would permanently harden the coating, and any particles embedded in the coating would remain solidified within the coating.

EXAMPLE II

Another curing agent for epoxy resin would be dicyandiamide. Dicyandiamide is a curing agent used between 3 and 7 percent by weight of epoxy resin, the same epoxy resin as described before. This dicyandiamide curing epoxy resin mixture also can be dissolved in the same solvents as described before, and applied in the same manner. The softening conditions will be equivalent and the curing conditions will be a little bit higher. To permanently harden the dicyandiamide cured epoxy resin would require 4 hours at 150°C, or 2 hours at 160°C, or 30 minutes at 200°C. Tacking conditions would be the same, to bring it up to 80°C using the same epoxy resin as mentioned before. The softening point of the epoxy resin coating can be varied by using a higher or lower molecular-weight epoxy resin. The lowest molecular weight that can be used to give a hard coating is the one described before, with an epoxy equivalent weight of 450–550. Suppliers of epoxy resin would be Shell Chemical Co., Dow Chemical Co., and Cibaleigy Corp. These companies supply epoxy resins in solid or liquid form, the solid ones that would be used in this invention are supplied in melting ranges starting from 60°C, on up in 10°C increments. Shell Chemical supplies Epon 1001, Epon 1002, Epon 1004, and these are epoxy resins with increasing melting points.

The resinous epoxy compositions which may be cured using the catalyst of this invention may be prepared, in accordance with one preferred procedure, by reacting predetermined amounts of at least one polyhydric phenol or polyhydric alcohol and at least one epihalohydrin in an alkaline medium. Phenols which are suitable for use in preparing such resinous polymeric epoxides include those which contain at least two phenolic hydroxide groups per molecule. Polynuclear phenols which have been found to be particularly sutiable include those wherein the phenol nuclei are joined by carbon bridges, such as, for example 4,4'-dihydroxy-diphenyl-dimethyl-methane (referred to hereinafter is bis-phenol A), 4,4'-dihydroxy-diphenyl-methyl-methane and 4,4'-dihydroxy-diphenyl-methane (referred to hereinafter as bisphenol F). In admixture with the named polynuclear phenols, use also may be made of those polynuclear phenols wherein the phenolic nuclei are joined by sulfur bridges, such as for example 4,4'-dihydroxy-diphenyl-sulfone. Polyhydroc alcohols are glycerol, glycol, propylene glycol and 1,5-pentanediol.

While it is preferred to use epicholorhydrin as the epihalohydrin in the preparation of the resinous polymeric epoxide starting material of the present invention, homologues thereof, for example, epibromohydrin and the like also may be used advantageously.

In the preparation of the resinous polymeric epoxides, aqueous alkali is employed to combine with the halogen of the epichlorohydrin reactant. The amount of alkali employed should be substantially equivalent to the amount of halogen present and preferably should be employed in an amount somewhat in excess thereof. Aqueous mixtures of alkali metal hydroxides, such as potassium hydroxide and lithium hydroxide may be employed although it is preferred to use sodium hydroxide since it is relatively inexpensive.

The product of the reaction, instead of being a single simple compound, is generally a complex mixture of glycidyl polyethers, but the principal product may be represented by the formula:

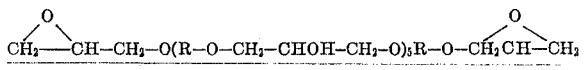

wherein n is an integer of the series 0, 1, 2, 3 and R represents the divalent hydrocarbon radical of the dihydric phenol. While for any single molecule of the polyether n is an integer, the fact that the obtained polyether is a mixture of compounds causes the determined value for n, from molecular weight measurement, to be an average which is not necessarily zero or a whole number.

Although the polyether is a substance primarily of the above formula, it may contain some material with one or both of the terminal glycidyl radicals in hydrated form.

The simplest polyether is a diglycidyl diether of the dihydric phenol which contains a single divalent aromatic hydrocarbon radical from the dihydric phenol and has two glycidyl radicals linked thereto by ethereal oxygen atoms. More generally, the polyether is of more complex character and contains two or more aromatic hydrocarbon radicals alternating with glyceryl groups in a chain which are linked together by intervening ethereal oxygen atoms.

The resinous polymeric epoxide, or glycidyl polyether of a dihydric phenol suitable for use in this invention has a 1,2-epoxy equivalency greater than 1.0. By epoxy equivalency reference is made to the average number of 1,2-epoxide groups:

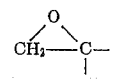

contained in the average molecule of the glycidyl ether. Owing to the method of preparation of the glycidyl polyethers and the fact that they are ordinarily a mixture of chemical compounds having somewhat different molecular weights and contain some compounds wherein the terminal glycidyl radicals are in hydrated form, the epoxy equivalency of the product is not necessarily the integer 2.0. However, in all cases, it is a value greater than 1.0. The 1,2-epoxy equivalency of the polyethers is thus a value between 1.0 and 2.0.

Resinous polymeric epoxides or glycidyl polyethers suitable for use in accordance with this invention may be prepared by admixing and reacting from one to ten mol proportions of an epihalohydrin, preferably epichlorohydrin, with from one to three mol proportions of bisphenol A in the presence of at least a stoichiometric excess of alkali based on the amount of halogen.

To prepare the resinous polymeric epoxides, aqueous alkali, bisphenol A and epichlorohydrin are introduced into and admixed in a reaction vessel. The aqueous alkali serves to dissolve the bisphenol A with the formation of the alkali salts thereof. If desired, the aqueous alkali and bisphenol A may be admixed and the epichlorohydrin added thereto, or an aqueous solution of alkali and bisphenol A may be added to the epichlorohydrin. In any case, the mixture is heated in the vessel to a temperature within the range of about 80°C to 110°C for a period of time varying from about one-half hour to three hours, or more, depending upon the quantity of reactants used.

Upon completion of heating, the reaction mixture separates into layers. The upper aqueous layer is withdrawn and discarded, and the lower layer containing the desired epoxy, is washed with hot water to remove unreacted alkali and halogen salts, in this case sodium chloride. If desired, dilute acids, for example acetic acid or hydrochlotic acid, may be employed during the washing procedure to neutralize the excess alkali.

The glycidyl polyether-novolac resins suitable for combining with and for curing by the catalysts in accordance with this invention are prepared by condensing an epihalohydrin with a novolac resin of an aldehyde and a monohydric mononuclear alkyl phenol containing at least four carbon atoms in the alkyl group, which novolac resin contains about three to twelve phenolic hydroxyl groups per average molecule. The term "novolac" as used herein refers to fusible phenolaldehyde resins prepared by reacting at least one phenol with at least one aldehyde in the ratio of 1 mol phenol to from about 0.5 to 0.85 mol of aldehyde using an acidic catalyst. The condensation is effected by mixing the novolac resin with at least 3 mols of an epihalohydrin such as epichlorohydrin per phenolic hydroxyl equivalent of novolac resin and with addition of about 1 mol of alkali metal hydroxide per phenolic hydroxyl equivalent of novolac resin. The reaction mixture is maintained within the range of about 60°C to 150°C during the ensuing reaction. Upon completion of the reaction, the formed alkali metal salt and any unreacted hydroxide are removed from the resulting epoxy-novolac resin as are also unreacted epichlorohydrin and water, the resultant epoxy-novolac, in the form of a viscous liquid or solid, is separated from the reaction mixture and may be purified, if required. The resultant resin generally will be used in solvent solution.

The metallic amine chelates which may form a portion of the curing catalyst of this invention may be prepared by initially reacting one mol of a metal ester, having the general formula $M(OR)_4$ with two mols of triethanolamine and distilling off two mols of the low boiling alcohol, ROH. Suitable metallic amine chelates which may be used in accord with this invention include titanium amino chelate, aluminum amine chelate and silicon amine chelate. Particularly satisfactory results have been achieved when the metal amine chelate of this invention is titanium amine chelate. This titanium amine chelate is a chelating agent well known in the art and may be represented by the following structural formula:

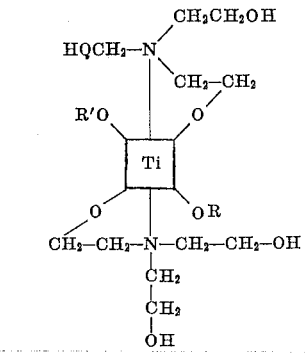

wherein R and R' may be aliphatic groups, aromatic groups or mixtures thereof.

The polyborate esters forming a portion of the curing catalyst of this invention are well known in the art and include those materials having the following structural formula:

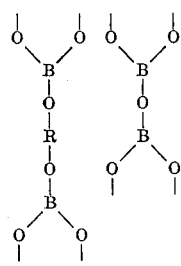

where the valence bonds at each end are satisfied by at least one radical selected from the group consisting of a bivalent R radical and a monovalent R' radical wherein R is a polyhydric alcohol. The polyhydric alcohols are selected from the group consisting of saturated aliphatic alcohols having from 2 to 6 OH groups per molecule, and the monohydric alcohols are selected from the group consisting of saturated and unsaturated aliphatic, aromatic or phenolic hydroxyl alcohols having at least one carbon atom per molecule. By the use of the term polyborate esters are meant compounds which contain two or more boron atoms.

While the teaching of this invention is applicable to polyborates in general, particularly satisfactory results have been achieved by using a polyborate ester having the formula shown below:

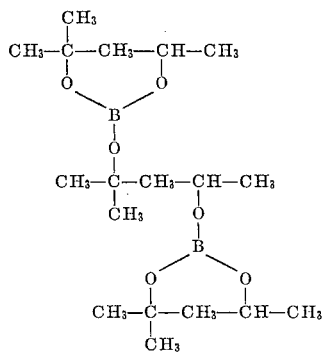

that is trihexylene glycol biborate. Equally satisfactory results have been obtained using the following polyborates:

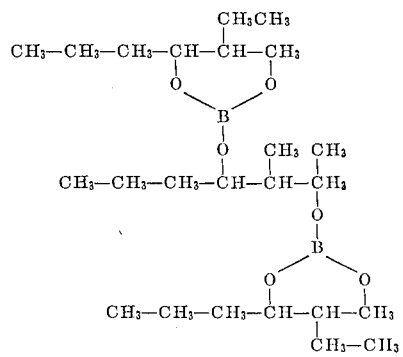

that is tri(octylene glycol) biborate; and

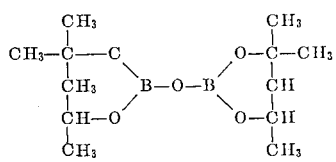

that is, hexylene glycol biborate.

The polyborate ester and metallic amine chelate or organic amine, will dissolve readily in liquid glycidyl polyethers and epoxy-novolacs to form homogeneous compositions. The resultant mixture may be stored for several months at room temperature without any appreciable increase in viscosity. Solid epoxy resins and epoxy-novolac resins generally are dissolved in a solvent before the hereindescribed liquid catalyst is added. It is a particularly important feature of this invention that when the catalyzed polyether mixture is subjected to elevated temperatures of from 60°C to 200°C and higher, the liquid glycidyl polyether-catalyst mixture readily reacts to form a hard, tough, cured resinous product. Such products exhibit low electrical losses over substantially all temperatures at which such apparatus operates.

EXAMPLE III — POLYVINYL COPOLYMERS

If the selected surfaces are coated with a vinyl copolymer material, this material, as before, can be made soft and sticky by appropriate heating measures or, as an alternate procedure, such vinyl copolymer coatings can be made soft and sticky by exposure to a solvent vapor, such as Freon 11 ($CCl_3F$). A polyvinyl copolymer mixture, which would soften to a gummy state when hot, and then subsequently harden when subjected to heat to be permanently hard, that is thermosetting, is described in U.S. Pat. No. 2,261,983, column 2 and is a mixture of polyvinyl acetal or polyvinyl butyral and phenolic resin. The composition of the polyvinyl acetal-phenolic resin mixture could be acetal or butyral resin 65–80 parts, and phenolic resin 20–35 parts. The phenolic and acetal resin mixture is dissolved in a suitable solvent, such as acetone, or a mixture of toluene and alcohol and can then be brushed or sprayed or roller coated onto any metal surface. When this material is coated from solution the solvent evaporates, and a hard coating results that can be handled and fabricated. Subsequent momentary heating by any means to 80°C will soften the coating to a tacky condition. The tacky condition will remain for 30 minutes to an hour at the most. This material will be cured to a permanently hard condition by heating from 1 to 3 hours at 125° to 135°C. Suppliers of polyvinyl acetal and polyvinyl butyral are Shawinigan Chemical Ltd., a division of Monsanto Chemical Co. Another supplier is Union Carbide Chemical Co. Phenolic resins are supplied by Union Carbide Chemical Co. and the Industrail Materials Division at Manor, Pa. of Westinghouse. The complete coating systems, both the epoxy solution and the polyvinyl-phenolic combination are made by the Industrial Materials Division of Westinghouse at Manor, Pennsylvania.

It is possible to soften the polyvinyl copolymer coatings by subjecting these to a Freon vapor instead of heating. The Freons that could be used to soften the vinylphenolic coatings would be Freon 11, Freon 21 and Freon 113. After softening with Freon vapor the coating would have to be baked to remove the Freon vapor and to solidify the coating permanently to set it. The time and temperatures would be the same as mentioned before. Curing the coating would be 1 to 3 hours at 125° to 135°C. The heating of the coating would evaporate the Freon and would get rid of the Freon vapor. After the coating has been softened and the particles are embedded into the soft coating, the Freon should be removed by either vacuum treatment of the system, or sweeping air through the system, and then subsequent heating of the coating. The aforementioned conditions would remove the remaining Freon from the film. It may be desirable to add 30 minutes to curing conditions to make sure that the Freon is completely removed from the film.

EXAMPLE IV — POLYVINYL COPOLYMERS

If the selected surfaces are coated with a vinyl copolymer material, this material, as before can be made soft and sticky by appropriate heating measures, or, as an alternate procedure can be made soft and sticky by exposure to a solvent vapor such as Freon 11 ($CCl_3F$). A polyvinyl copolymer, which would soften to a gummy state when hot or subjected to Freon 11 vapor and then subsequently hardened when cooled or when the Freon 11 vapor is removed is polyvinyl acetal or polyvinyl butyral. This material cannot be permanently hardened, but can be made tacky or sticky repeatedly by heating or exposure to Freon 11. Thus it can be made hard or non-sticky during assembly of the system. It can be made sticky or tacky after assembly by heat or exposure to Freon 11 and can remain sticky or tacky during the operation of the equipment either by maintaining the softening temperature or maintaining an adequate vapor pressure of Freon 11 in the system in the presence of the insulating gas, which should not affect the insulating qualities of the gas. It can be temporarily hardened by either lowering the temperature or removing the Freon 11 vapor if desired when for instance the system is opened for repairs or additions and resoftened after reassembly.

EXAMPLE V — POLYVINYL COPOLYMERS

If the selected surfaces are coated with a vinyl copolymer material, this material, as before can be made soft and sticky by appropriate heating measures, or, as an alternate procedure can be made soft and sticky by exposure to a solvent vapor such as Freon 11 ($CCl_3F$). A polyvinyl copolymer, which would soften to a gummy state when hot or subjected to Freon 11 vapor and then subsequently hardened when cooled or when the Freon 11 vapor is removed is polyvinyl acetal or polyvinyl butyral. This material cannot be permanently hardened, but can be made tacky or sticky repeatedly by heating or exposure to Freon 11. Thus it can be made hard or non-sticky during assembly of the system. It can be made sticky or tacky after assembly by heat or exposure to Freon 11 for a limited time period and rendered hard during operation of the equipment but subsequently again rendered soft and sticky any number of times if particles have been generated or repairs have been performed requiring opening of the system. This last mode of operation appears to be the mode offering most technical advantages in terms of making it possible to repair a system which has experienced trouble.

From the foregoing description of the invention it will be apparent that there has been provided a novel means of captivating or rendering inactive loss minute contaminating conducting or insulating particles within gas-filled transmission and distribution equipment of the type set forth in the illustrations. Where the distance between parts at different potentials are relatively short, the hazards of breakdown or flashover is a constant problem. This hazard is aggravated by the presence of contaminating conducting or insulating particles. By application of one or more of the coatings described previously, which is hard, or non-tacky during the assembly operation, the particles may be trapped in a selected region preferably in a low electric field, by rendering the coatings sticky or tacky by either raising the temperature or by exposure to a solvent vapor. Subsequently a further increase in the temperature, or removal of the solvent vapor and attainment of a curing temperature, the coating can be permanently hardened and thereby permanently entrap or captivate the particles. Alternatively the coating may be rendered sticky or tacky during the operation of the equipment and thereby captivate new particles generated during the operation. In this case the coating is only rendered hard if the system has to be opened for any reason so as to prevent collection of particles during the time which it is open. A third mode is to render the coating soft or sticky after assembly and subsequently harden it by removing a solvent vapor, but not to harden the coating permanently. In this mode the coating can be resoftened at any time if required, such as may occur after repair or after experiencing breakdown problems.

In all these applications of coatings electrical fields or mechanical means such as gas flow or mechanical shaking of the systems may be used to ensure particle movements up to the point in when the particle is trapped by the sticky coating.

FIGS. 12–18 illustrate further embodiments of the invention wherein coatings 130 are applied to insulating spacers 150–155 utilized to support the high-voltage conductors 141 in pressurized-gas electrical power-transmission systems, such as set forth in patents hereinbefore cited, typical ones of which are U.S. Pat. Nos. 3,448,202 to Whitehead and 3,345,450 to Spindle.

Figure 12:
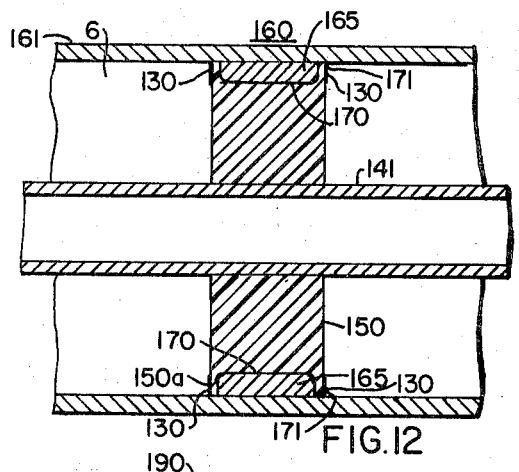
FIG. 12 is a vertical sectional view taken through a pressurized-pipe power transmission system illustrating a surface coating provided on an insulating spacer supporting the interior high-voltage transmission conductor.

FIG. 12 illustrates a vertical sectional view taken through a high-voltage power-transmission system 160 in which the reference numeral 161 indicates the outer grounded metallic housing, within which is disposed the insulating spacer 150 having a ring-shaped metallic insert 165 located about its outer periphery, as shown in FIG. 12. The presence of the metallic insert 165 reduces the field along the outer surface 150a of the insulating disc 150 or spacer at the areas indicated by the reference numeral 15a. As well known by those skilled in the art, the metallic insert 165 places the ground potential point at the location indicated by the reference numeral 170 and a low electrical field condition exists at the areas indicated by the reference numeral 171. It is at these low electrical field regions that the coating 130 is preferably placed.

Figure 13:
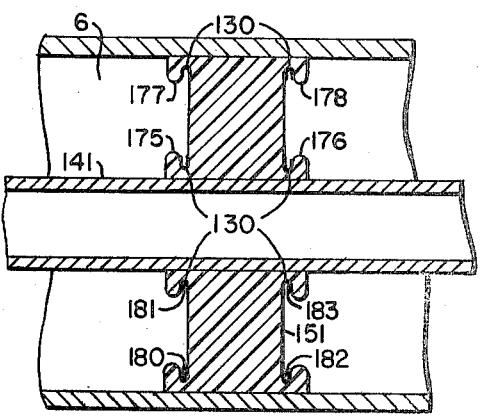
FIG. 13 is a vertical sectional view taken through a modified-type spacer construction.

In the modification of FIG. 13, the disc or spacer 151 has a different configuration having radially extending boss portions 175–178 on both sides of the spacer 151 at the outer and inner peripheries thereof. The coating 130 is positioned at the areas indicated by the reference numerals 180–183.

Figure 14:
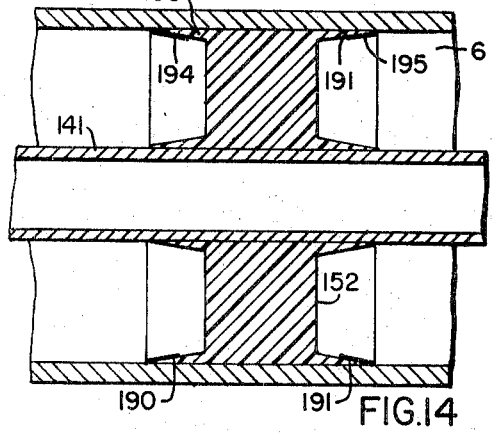
FIG. 14 is a vertical sectional view taken through a further modified-type of insulating spacer construction.

FIG. 14 illustrates a modified type of spacer construction 152 in which, due to the configuration of the spacer 152 having axially-extending portions 190 and 191, a reduced electrical gradient is provided and the coatings 130 are positioned at the areas indicated by the reference numerals 194, 195.

Figure 15:
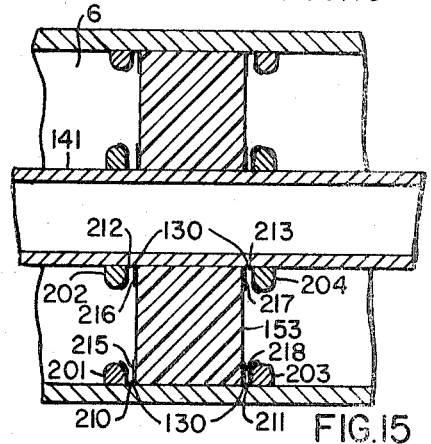
FIG. 15 illustrates still a further modified-type of spacer construction, the view being taken in vertical cross-section.

FIG. 15 illustrates a further modified typed of spacer or disc construction 153 in which a plurality of concentric metallic rings 201–204 are provided spaced laterally outwardly from the spacer 153. As well known by those skilled in the art, reduced electrical-field gradient conditions are present within the regions denominated by the reference numerals 210–213. Preferably the coatings 130 are provided at these areas of reduced electrical field stress, as indicated by the reference numerals 215–218.

Figure 16:
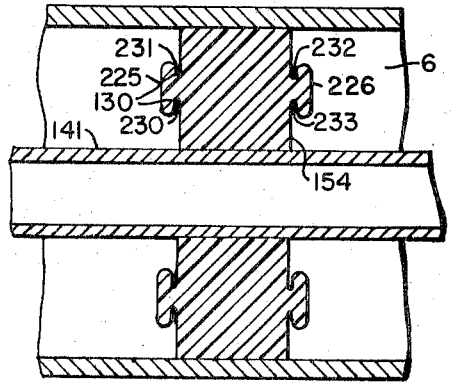
FIG. 16 is a vertical cross-sectional view taken through another modified-type of insulating spacer construction.

FIG. 16 shows a further modified type of spacer construction 154, somewhat similar to that previously described in connection with FIG. 13, and having annular boss portions 225, 226, which five rise to a reduced electrical field gradient in the regions designated by the reference numerals 230–233. As before, the coating 130 is preferably located within these reduced stress regions 230–233.

Figure 17:
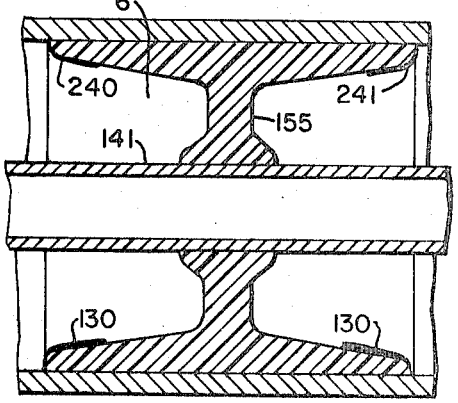
FIG. 17 illustrates a vertical sectional view taken through an alternate-type of spacer construction.

FIG. 17 is a further modified type of construction in which the spacer 155 is coated at the portions indicated by the reference numerals 240, 241, where reduced electrical field conditions exist.

Figure 18:
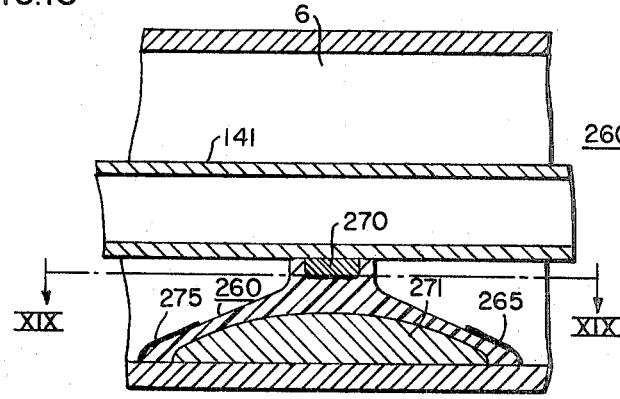
FIG. 18 illustrates an insulating coating provided on a post-type supporting spacer supporting at its upper end the high-volage conductor within a pressurized-pipe power-transmission system; and, FIG. 19 is a sectional plan view taken along the line XIX—XIX of FIG. 18.

FIG. 18 illustrates a modified type of insulating supporting construction 260 in which, instead of the supporting means being annular in configuration, instead a post-type member 265 is utilized having a symmetrical construction as illustrated in FIG. 19, and having metallic inserts 270 and 271 provided therein to result in reduced field stress conditions existing at the outer areas 275. Coatings 130 are applied to these areas 275 of reduced field stress locations.

From the foregoing description of the invention, it will be apparent that there has been provided a novel means of captivating or rendering inactive floating or levitating minute contaminating particles within gas-filled substation or transmission equipment of the type set forth in the illustrations. Where the spaces between parts at different potential are relatively small, the hazard of breakdown or flashover is a constant problem. This hazard is aggravated by the presence of such minute contaminating metallic or insulating particles, which may settle on insulating surfaces and be thereby conductive to voltage breakdown. By the coating described in the present application, which is hard, or nontacky during the assembly operations, the particles may be trapped by rendering the surface film of the coating sticky or tacky by the raising of the temperature conditions of the coating, as heretofore described. Subsequently, by an increase of the temperature, or by a removal of the solvent vapor, and the attainment of a curing temperature, the epoxy material will become permanently or temporarily cured or hardened, and thereby entrap or captivate the contaminating particles.

It is preferable to rap the conducting or insulating particles 16 in a relatively low-gradient electrical field, for instance, as shown by the coating 130 in FIG. 11 of the drawings, wherein it will be apparent that the coating 130 is on the inner surface of the outer grounded sheath or enclosure 142.

However, for particular applications, particularly where the coating 130 is cured or polymerized, thereby fixedly encapsulating such particles, the tacky coating 130 may, additionally, be provided on the outer surface of the inner high-voltage conductor 141 of FIG. 11. As mentioned, however, preferably, we envision the trapping of such contaminated particles 16 in a relatively low-gradient electrical field region.

In regard to the utilization of heating means to either effect a permanent cure of the tacky or sticky coating 130, or, alternatively, to render such coating 130 tacky for a short period of time, heating means, of the type set forth in FIG. 11, utilizing a low-voltage high-current source may be effectively employed. In more detail, a short-circuit connection 280, as illustrated in FIG. 11, may be employed in conjunction with such a low-voltage high-current source 18 to heat the parts by the $I^2R$ losses, and radiation between the heated metallic parts.

An alternative method of heating would be from outside the system, such as shown in FIG. 11. This could either be an induction coil heater 278 or an electrical heater. The heater 278 would be designed such that it could be moved axially along the outside of the system to heat each section of the transmission line in turn.

The heating is done to either permanently cure the coating 130, which has been applied on selected areas, to cure it permanently, or to render it sticky for a limited period of time so that it traps the conducting particles 16 permanently.

Although there has been illustrated and described specific structures, and methods, it is to be clearly understood that the same were merely for the purpose of illustration, and that changes and modifications may readily be made therein by those skilled in the art without departing from the spirit and scope of the invention.

We claim:

1. In gas-insulated electrical equipment, in combination,
   a. means defining a pair of spaced metallic electrical members which are at different voltage potentials,
   b. an insulating gas disposed in the region interposed between said spaced metallic electrical members for insulation purposes and to prevent voltage breakdown between said electrical members,
   c. one or more members associated with said gas-insulated equipment,
   d. means providing a hard coating on the surface of one or more of said members to enable the ready assembly of the electrical equipment,
   e. means for rendering the surface of said hard coating subsequently sticky and tacky for causing the adherence thereto of minute contaminating particles and thereby effecting the trapping or captivation of said minute contaminating particles.

2. The combination according to claim 1, wherein the spaced members are insulating spacers for supporting one of the electrical members.

3. The combination according to claim 1, wherein the spaced members are support-insulators for supporting one of the electrical members.

4. The combination according to claim 1, wherein said coating has the physical characteristics of being rendered tacky at periodic intervals.

5. The combination according to claim 1, wherein means for admitting a solvent vapor into the equipment is provided.

6. The combination according to claim 1, wherein the spaced metallic members are respectively an outer cylindrical metallic grounded cylinder and an inner elongated high-voltage conductor.

7. The combination according to claim 6, wherein the insulating member is an insulating spacer for spacing the inner high-voltage conductor radially inwardly from the outer enveloping hollow grounded cylindrical metallic member.

8. A compressed-gas circuit interrupter including a pair of separable contacts,
   a means including a high-pressure chamber for forcing a blast of gas between the separated contacts to effect extinction of the arc drawn therebetween,
   b. said high-pressure chamber including an outer grounded metallic housing and an inner high-voltage conductor disposed axially within the outer grounded conductor,
   c. high-pressure gas disposed in the annular region between the inner high-voltage conductor and the outer cylindrical grounded housing, and,
   d. means for, at times, providing a sticky coating on the inner surface of the outer grounded metallic housing for trapping contaminating particles.

9. The combination ccording to claim 8, wherein the sticky surface is also on the surface of the inner high-voltage conductor.

10. The combination according to claim 1, wherein the coating has the physical characteristics of being rendered periodically sticky or at times relatively hard depending upon the wishes of maintenance personnel.

11. The combination of claim 1, wherein an added electrical field is employed to electrically accelerate the moement of the minute contaminating particles within the added electrical field.

12. The combination according to claim 1, wherein the coatings are two types, one being of the characteristics of being permanently hard and other areas of coating material having the physical characteristics of being only temporarily hardened.

13. The combination according to claim 1, wherein the means for rendering the surface of the hard coating sticky and tacky comprises heating means.

* * * * *